United States Patent [19]

Pierrot

[11] Patent Number: 5,760,140
[45] Date of Patent: Jun. 2, 1998

[54] ABRASION-RESISTANT COMPOSITIONS AND THEIR USE AS FLOOR COVERINGS

[75] Inventor: Jean-Michel Pierrot, Grosley Sur Risle, France

[73] Assignee: Elf Atochem S.A., Puteaux, France

[21] Appl. No.: 440,791

[22] Filed: May 15, 1995

[30] Foreign Application Priority Data

May 20, 1994 [FR] France ................... 94 06177

[51] Int. Cl.$^6$ ............... C08L 35/02; C08L 23/08
[52] U.S. Cl. .......... 525/207; 525/206; 525/208; 525/222; 525/227
[58] Field of Search ............... 525/207, 206, 525/208, 222, 227

[56] References Cited

U.S. PATENT DOCUMENTS

| 3,978,026 | 8/1976 | Katzakian, Jr. ............. | 528/89 |
|---|---|---|---|
| 4,433,073 | 2/1984 | Sano ........................... | 523/201 |
| 4,855,363 | 8/1989 | Moteki ........................ | 525/207 |
| 5,139,817 | 8/1992 | Abe ............................. | 427/54.1 |
| 5,242,981 | 9/1993 | Izumi ........................... | 525/133 |
| 5,512,634 | 4/1996 | Doi .............................. | 525/182 |
| 5,541,243 | 7/1996 | Ohmura ....................... | 525/128 |

FOREIGN PATENT DOCUMENTS

| 91/00428 | 2/1993 | Belgium. |
|---|---|---|
| 321760 | 6/1989 | European Pat. Off.. |
| 3927719 A1 | 2/1991 | Germany. |
| 92/19562 | 11/1992 | WIPO. |
| WO 92/19562 | 11/1992 | WIPO. |

*Primary Examiner*—Fred Zitomer
*Attorney, Agent, or Firm*—Pennie&Edmonds LLP

[57] ABSTRACT

The invention relates to a composition based on ethylene copolymers for manufacturing floor coverings and comprising: a) a copolymer having at least one epoxide functional group, b) a copolymer of ethylene and of at least one unsaturated monomer having functional groups which are reactive with the epoxide functional group of a), c) fillers, and optionally d) ethylene-vinyl acetate or ethylene-alkyl (meth)acrylate copolymers. The floor coverings obtained have an abrasion according to DIN 53516 of less than 300 mm$^3$, a resistance to scratching which is greater than 150 g, and an oxygen index which is greater than 30.

10 Claims, No Drawings

ABRASION-RESISTANT COMPOSITIONS AND THEIR USE AS FLOOR COVERINGS

FIELD OF THE INVENTION

The present invention relates to a composition, based on ethylene copolymers, for manufacturing floor coverings. More particularly, this invention relates to compositions suitable for the manufacture of floor coverings having enhanced resistance to wear and enhanced scratch-resistance. The compositions comprise at least copolymers having epoxide groups, copolymers of ethylene with unsaturated monomers, and fillers.

BACKGROUND OF THE INVENTION

Floor or wall covering products are very often based on poly(vinyl chloride) ("PVC"). The compositions are generally composed of PVC, of a plasticizer, and of fillers, such as calcium carbonate. They are easy to prepare and are calendered at around 120° or 130° C. in order to be shaped into panels. They can also be colored by incorporating pigments therein. However, these compositions do not have good resistance to wear or to abrasion and have poor resistance to scratching.

Patent Application BE 91/00428 describes floor covering compositions composed of ethylene-vinyl acetate copolymer ("EVA"), of ethylene-acrylic acid or ethylene-acrylic acid treated with metal salts (ionomer) copolymer, of fillers and, optionally, of polyethylene or polypropylene. These floor coverings are manufactured by using the techniques used for PVC. Mixing is carried out at 125° C. and calendering between 100° and 130° C.

Application WO 92/19562 also describes floor covering compositions composed of EVA, of ethylene-alkyl acrylate copolymers, of ethylene-acrylic acid or ionomer copolymers, of ethylene-maleic anhydride copolymer, and of fillers.

Application EP 321,760 describes floor covering compositions composed of EVA, of polypropylene, of fillers and, optionally, of ethylene-propylene copolymer. Mixing is carried out at 120°–130° C.

The floor coverings manufactured according to the prior art do not have a satisfactory resistance to abrasion and to scratching. To make these coverings more resistant, it would be necessary to increase the proportion of copolymers to the detriment of the fillers, which leads to poorer fireproofing. It would also be necessary to increase the viscosity of the copolymers and the mixing and calendering temperature would then be excessively high.

SUMMARY OF THE INVENTION

A new composition based on ethylene copolymers for manufacturing floor coverings, while using the techniques for coverings based on PVC, has now been found. The coverings thus manufactured have a resistance to wear and to scratching which is much better than that of the coverings of the prior art.

The composition of the invention comprises:
a) at least one copolymer having at least one epoxide functional group,
b) at least one copolymer of ethylene and of at least one unsaturated monomer having functional groups which are reactive with the epoxide functional group of the copolymer a),
c) fillers, and optionally,
d) one or a number of copolymers chosen from copolymers of ethylene and of vinyl acetate and copolymers of ethylene and of one or a number of alkyl (meth) acrylates.

The present invention also relates to the floor coverings manufactured with this composition. The materials manufactured with these compositions, in particular floor coverings, have an abrasion according to DIN 53516 which is less than 300 mm 3 and preferably less than 250. They also have a resistance to scratching which is greater than 150 g and preferably from 200 to 250 g. It is measured by the load on a diamond needle.

DESCRIPTION OF THE PREFERRED EMBODIMENTS

The present invention provides an abrasion-resistant floor covering composition that comprises a) at least one copolymer having at least one epoxide functional group, b) at least one copolymer of ethylene and of at least one unsaturated monomer having functional groups which are reactive with the epoxide functional group of the copolymer a), and c) fillers. The composition of the invention has a resistance to abrasion according to DIN 53516 of less than 300 mm$^3$. The abrasion-resistant composition of the present invention may further comprise d) at least one copolymer selected from the group consisting of copolymers of ethylene with vinyl acetate and copolymers of ethylene with at least one alkyl (meth)acrylate.

Component a)

The copolymer a) can be a polyepoxide compound of general formula:

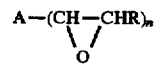

in which A is a polyfunctional group with a valency n>2 and R is a hydrocarbon radical or a hydrogen atom. Such compounds and the manner of their synthesis are well known to those skilled in the art.

Mention may be made, as examples of polyepoxide compounds which may be used in accordance with the present invention, of polyglycidyl ethers of polyhydroxylated compounds. Among the latter, one may use polyepoxide compounds of aromatic type, such as those derived from bisphenol A. One may also use polyepoxide compounds of aliphatic type, particularly the polyglycidyl ethers of polyalcohols, such as the diglycidyl ethers of α,ω-diols, like the diglycidyl ether of butanediol, of hexanediol, of para-cyclohexyldimethanol or of neopentyl glycol, such as the triglycidyl ethers of triols, like the triglycidyl ether of trimethylolpropane or the triglycidyl ether of glycerol, or such as the tetraglycidyl ethers of tetrols, like the tetraglycidyl ether of pentaerythritol.

Among the compounds originating from the epoxidation of olefinic compounds, a common synthetic route to epoxy compounds, epoxidized soybean oil is advantageously chosen for use in accordance with the present invention. The copolymer a) can also be an epoxidized polybutadiene.

In another embodiment of the present invention, copolymer a) can be a copolymer of ethylene and of an unsaturated epoxide. As regards the unsaturated epoxides of a), mention may especially be made of aliphatic glycidyl esters and ethers such as glycidyl (meth)acrylate, glycidyl maleate, glycidyl itaconate, vinyl glycidyl ether or alkyl glycidyl ether. Mention may also be made of alicyclic glycidyl esters and ethers such as 2-cyclohexen-1-yl glycidyl ether, glycidyl cyclohexene-4,5-dicarboxylate, glycidyl cyclohexene-4-carboxylate, glycidyl 5-norbornene-2-methyl-2-carboxylate and diglycidyl endocis-bicyclo[2.2.1]hept-5-ene-2,3-dicarboxylate. Among these unsaturated epoxides, glycidyl acrylate and methacrylate are very particularly preferred.

Copolymers a) can also comprise vinyl acetate or one or a number of alkyl (meth)acrylates. The alkyl group of the alkyl (meth)acrylate has up to 10 carbon atoms and can be linear, branched, or cyclic. Mention may especially be made, as illustration of the alkyl (meth)acrylate, of n-butyl acrylate, isobutyl acrylate, 2-ethylhexyl acrylate, cyclohexyl acrylate, methyl methacrylate, and ethyl methacrylate. Among these (meth)acrylates, ethyl acrylate, n-butyl acrylate, and methyl methacrylate are preferred.

Thus, preferred embodiments of component a) include copolymers of glycidyl acrylate and/or glycidyl methacrylate with ethylene and with one or more of vinyl acetate, alkyl acrylates, and alkyl methacrylates.

The copolymer a) is most advantageously a copolymer of ethylene, of an alkyl (meth)acrylate, and of glycidyl methacrylate containing, by weight, 2 to 10% and preferably 6 to 8% of glycidyl methacrylate and at least 50% of ethylene.

Component b)

In the copolymer b), the unsaturated monomer having functional groups which are reactive with the epoxy functional group of the copolymer a) can be, for example: an unsaturated dicarboxylic acid anhydride such as citraconic anhydride, itaconic anhydride, tetrahydrophthalic anhydride, 2-methylmaleic anhydride, 2,3-dimethylmaleic anhydride, and maleic anhydride, an unsaturated acid or diacid such as (meth)acrylic acid, crotonic acid, or cinnamic acid, a product having a primary amine or secondary amine functional group, and a product having an alcohol functional group. Maleic anhydride copolymers are particularly preferred.

Copolymers b) can also comprise vinyl acetate or one or a number of alkyl (meth)acrylates. The alkyl group of the alkyl (meth)acrylate has up to 10 carbon atoms and can be linear, branched, or cyclic. Mention may especially be made, as illustration of the alkyl (meth)acrylate, of n-butyl acrylate, isobutyl acrylate, 2-ethylhexyl acrylate, cyclohexyl acrylate, methyl methacrylate, and ethyl methacrylate. Among these (meth)acrylates, ethyl acrylate, n-butyl acrylate, and methyl methacrylate are preferred.

Thus, preferred embodiments of component b) include copolymers of maleic anhydride with ethylene and with one or more of vinyl acetate, alkyl acrylates, and alkyl methacrylates.

The copolymer b) is most advantageously a copolymer of ethylene, of an alkyl (meth)acrylate, and of maleic anhydride containing, by weight, 2 to 3% of maleic anhydride and at least 50% of ethylene.

Component c)

The fillers c) can be kaolin, calcium carbonate, precipitated carbonate and/or more specifically fireproofing fillers such as aluminum or magnesium hydroxides.

Depending on the uses of the floor coverings, it may be necessary for them to have good fire resistance. These fillers c) are known per se but it has been discovered that the compositions of the invention could contain significant amounts thereof without harming their mechanical properties or making their manufacture difficult.

These fillers can be incorporated until oxygen indices above 30 and advantageously between 30 and 35 are obtained.

The compositions of the invention may also incorporate therein conventional additives such as release agents, including stearates, fatty amines, and the like, protective agents, including heat-resistant additives and anti-ultraviolet additives, pigments, and dyes.

Component d)

Optional component d) comprises at least one copolymer selected from the group consisting of copolymers of ethylene with vinyl acetate and copolymers of ethylene with at least one alkyl (meth)acrylate. The alkyl group of the alkyl (meth)acrylate which forms of the copolymer d) has up to 10 carbon atoms and can be linear, branched, or cyclic. Mention may especially be made, as illustration of the alkyl (meth) acrylate, of n-butyl acrylate, isobutyl acrylate, 2-ethylhexyl acrylate, cyclohexyl acrylate, methyl methacrylate or ethyl methacrylate. Among these (meth)acrylates, ethyl acrylate, n-butyl acrylate and methyl methacrylate are preferred.

The copolymers d) most advantageously contain 5 to 40% by weight of vinyl acetate or of alkyl (meth)acrylate and preferably 20 to 35%.

Floor coverings

The floor coverings are manufactured by calendering according to known techniques. It is possible to use the same techniques as for coverings based on PVC.

The composition of the present invention is obtained in a known way by any technique for mixing in the molten state such as, for example, extrusion or an internal mixer.

The amounts of necessary epoxide functional groups contributed by a) and of necessary reactive functional groups contributed by b) are determined by the resistance to abrasion and to scratching of the materials, in particular the floor coverings manufactured with the compositions of the invention. The higher the number of these functional groups, the more resistant the material is to abrasion and to scratching.

The ratio of the number of epoxide functional groups contributed by a) to the number of reactive functional groups contributed by b) can be between 0.5 and 2 and preferably in the region of stoichiometry, i.e. 1. For example, if the comonomer of b) is maleic anhydride, the stoichiometry is 2 epoxide functional groups per one maleic anhydride.

The reaction between the epoxide of the copolymer a), and the reactive functional group of the copolymer b) is slow at room temperature and up to 180° –190° C. and the reaction is then continued slowly at room temperature for approximately two weeks. This increase in the molar mass makes it possible to obtain resistances to abrasion and to scratching which are better than those of the prior art while using the usual temperatures for PVC containing fillers, that is to say approximately 120° C.

To obtain a covering having good resistance to abrasion or to friction and which does not comprise the copolymers a) and b) of the present invention, compositions of higher viscosity would be needed requiring high mixing and calendering temperatures, such as 160° or 180° C., which is incompatible with the materials used for floor coverings based on PVC. Resistance to abrasion can then be obtained but the resistance to scratching is not good. The compositions of the invention have the unexpected advantage of good resistance to abrasion and to scratching.

It is also possible to add catalysts in order to accelerate this reaction. Mention may especially be made, among the compounds capable of accelerating the reaction between the epoxide of a) and the reactive functional group of b), of: tertiary amines, such as dimethyllaurylamine, dimethylstearylamine, N-butylmorpholine, N,N-dimethylcyclohexylamine, benzyldimethylamine, pyridine, 4-(dimethylamino)pyridine, 1-methylimidazole, tetramethylguanidine, triethylenediamine, tetramethylhydrazine, N,N-dimethylpiperazine, N,N,N',N'-tetramethyl-1,6-hexanediamine, or a mixture of tertiary amines having from 16 to 18 carbon atoms known under the name of dimethyl tallow amines, tertiary phosphines, such as triphenylphosphine, and zinc alkyldithiocarbamates.

By using a catalyst, it is possible to obtain, for example, depending on the amounts, complete reaction in 2 hours at 160° C.

It is preferable to heat the composition of the invention containing the catalyst after the calendering. A heating tunnel or any equivalent device can be used.

The amounts of the various copolymers and fillers are chosen by a person skilled in the art as a function of the desired properties. He can adjust the amounts and also choose copolymers having various proportions of comonomers. Especially preferred are compositions comprising: 1 to 20 parts of a), 5 to 20 parts of b), 30 to 70 parts of c), and 0 to 30 parts of d).

EXAMPLES

In the following Examples, the resistance to scratching is measured as follows. A needle with a diamond point is loaded with 10 g weights in 10 g increments. It wanders over the panel and when a scratch is observed, the load in grams is recorded.

In the Examples, the percentages and the parts are by weight, except when otherwise indicated.

Example 1

The following were mixed:
4 parts of an ethylene/20% methyl methacrylate/8% glycidyl methacrylate copolymer,
12 parts of an ethylene/25% methyl methacrylate/2% maleic anhydride copolymer,
20 parts of an ethylene/24% methyl methacrylate copolymer,
15 parts of kaolin,
15 parts of chalk,
33.3 parts of aluminum trihydrate, and
0.7 parts of calcium stearate.

The mixture was calendered at 120° C. and then, after a few days, the following measurements were taken:

| Abrasion according to | |
|---|---|
| DIN 53516 | 210–250 mm³ |
| Resistance to scratching | 300 to 250 g |
| Oxygen index | 30–32 |

Example 2 (comparative)

A composition was prepared containing neither copolymer having an epoxide nor copolymer having a functional group which is reactive with the epoxide. The amount of fillers is not the same as in Example 1 because it was impossible to put as much in. The following were mixed:
28 parts of a mixture of EVA containing 30% of vinyl acetate and of ethylene-methyl acrylate copolymer containing 30% of acrylate,
12 parts of polypropylene,
28 parts of kaolin,
31.4 parts of chalk,
0.1 part of vulkanox R, and
0.5% of ethylenebisstearamide (release agent).

The mixture was calendered at 160° C. and then the following measurements were taken:

| DIN 53516 | 280–350 mm³ |
|---|---|
| Resistance to scratching | 80–90 g |
| oxygen index | 24–27 |

Example 3 (comparative)

A second composition was prepared containing neither copolymer having an epoxide nor copolymer having a functional group which is reactive with the epoxide. Again, the amount of fillers is not the same as in Example 1 because it was impossible to put as much in. The following were mixed:
28 parts of a mixture of EVA containing 30% of vinyl acetate and of ethylene-methyl acrylate copolymer containing 30% of acrylate,
12 parts of polypropylene,
15 parts of kaolin,
15 parts of chalk,
29.4 parts of aluminum trihydrate,
0.1 part of vulkanox R, and
0.5% of ethylenebisstearamide (release agent).

The mixture was calendered at 160° C. and then the following measurements were taken:

| DIN 53516 | 280–350 mm³ |
|---|---|
| Resistance to scratching | 80–90 g |
| oxygen index | 28–30 |

Many modifications and other embodiments of the invention will come to the mind of one skilled in the art having the benefit of the teachings present in the foregoing descriptions. It is to be understood, therefore, that the invention is not to be limited to the specific embodiments disclosed, and that all such modifications and embodiments are intended to be included within the scope of the appended claims.

What is claimed is:

1. An abrasion-resistant floor covering composition comprising:
   a) at least one copolymer having at least one epoxide functional group wherein the copolymer is selected from the group consisting of copolymers of ethylene and glycidyl methacrylate, copolymers of ethylene/alkyl(meth)acrylates/glycidyl methacrylate and copolymers of ethylene/vinyl acetate/glycidyl methacrylate,
   b) at least one copolymer of ethylene and of at least one unsaturated monomer having functional groups which are reactive with the epoxide functional group of the copolymer a) wherein the copolymer is selected from the group consisting of copolymers of i. ethylene with a member selected from the group consisting of acrylic acid, maleic acid and maleic anhydride, ii. ethylene and an alkyl(meth)acrylate with a member selected from the group consisting of acrylic acid, maleic acid, and maleic anhydride, and iii. ethylene and vinyl acetate with a member selected from the group acrylic acid, maleic acid and maleic anhydride; and c) fillers, the resistance to abrasion according to DIN 53516 of said composition being less than 300 mm$^3$.

2. The abrasion-resistant composition of claim 1, further comprising
   d) at least one copolymer selected from the group consisting of copolymers of ethylene with vinyl acetate and copolymers of ethylene with at least one alkyl (meth) acrylate.

3. The abrasion-resistant composition of claim 1, wherein component a) is a copolymer of ethylene with glycidyl (meth)acrylate, and component b) is a copolymer of ethylene with maleic anhydride.

4. The abrasion-resistant composition of claim 3, wherein component a) is a copolymer of ethylene with glycidyl (meth)acrylate and with at least one member selected from the group consisting of vinyl acetate and alkyl (meth) acrylates, and component b) is a copolymer of ethylene with maleic anhydride and with at least one member selected from the group consisting of vinyl acetate and alkyl (meth) acrylates.

5. The abrasion-resistant composition of claim 1, herein component c) comprises fireproofing fillers in an amount sufficient for the oxygen index of said composition to be greater than 30.

6. The abrasion-resistant composition of claim 1, comprising 1 to 20 parts by weight of component a), 5 to 20 parts by weight of component b), 30 to 70 parts by weight of component c), and 0 to 30 parts by weight of component d).

7. As an article of manufacture, an abrasion-resistant floor covering composition according to one of claims 1 to 6.

8. The article of claim 7, characterized in that it has a resistance to scratching which is greater than 150 g.

9. The article of claim 8, characterized in that the abrasion is less than 250 mm$^3$ and the resistance to scratching is between 200 and 250 g.

10. An abrasion-resistant floor covering comprising a component a) and a component b) wherein component a) comprises a copolymer selected from the group consisting of a copolymer comprising ethylene, vinyl acetate and glycidyl methacrylate units, a copolymer comprising ethylene and glycidyl methacrylate units, a copolymer comprising ethyl acrylate units, a copolymer comprising n-butyl acrylate units, a copolymer comprising isobutyl acrylate units, and a copolymer comprising methyl methacrylate units; and wherein component b) comprises a copolymer selected from the group consisting of copolymers of ethylene with a member selected from the group consisting of acrylic acid, maleic acid and maleic anhydride; copolymers of ethylene and alkyl(meth)acrylate with a member selected from the group consisting of acrylic acid, maleic acid and maleic anhydride;

copolymers of ethylene and vinyl acetate with a member selected from the group consisting of acrylic acid, maleic acid and maleic anhydride.

wherein the resistance to abrasion according to DIN 53516 of said floor covering is less than 300 mm$^3$.

* * * * *